US011019440B1

(12) United States Patent
Beck et al.

(10) Patent No.: US 11,019,440 B1
(45) Date of Patent: May 25, 2021

(54) METHODS AND DEVICES FOR MANAGING TRANSMISSION OF SYNCHRONIZED AUDIO BASED ON USER LOCATION

(71) Applicant: Lenovo (Singapore) Pte. Ltd., New Tech Park (SG)

(72) Inventors: Kevin Wayne Beck, Raleigh, NC (US); Roderick Echols, Chapel Hill, NC (US); Ryan Charles Knudson, Durham, NC (US); Russell Speight VanBlon, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 16/747,142

(22) Filed: Jan. 20, 2020

(51) Int. Cl.
*H04R 29/00* (2006.01)
*G10L 25/51* (2013.01)
*G06F 3/16* (2006.01)
*H04R 3/00* (2006.01)

(52) U.S. Cl.
CPC .......... *H04R 29/001* (2013.01); *G06F 3/165* (2013.01); *G10L 25/51* (2013.01); *H04R 3/00* (2013.01); *H04R 2430/01* (2013.01)

(58) Field of Classification Search
CPC ........ G06F 3/04883; G06F 3/01; G06F 1/163; G06F 1/3206; G06F 1/3209; G06F 1/3287; G06F 21/6245; G06F 3/0482; G06F 3/04845; H04N 5/23206; H04N 5/23216; H04N 5/23218; H04N 5/23219; H04N 5/23222; H04N 5/23238; H04N 5/23241; H04N 5/232411; G10L 21/0208; H04R 1/028; H04R 3/04

USPC ...................................................... 381/56–58
See application file for complete search history.

(56) References Cited

U.S. PATENT DOCUMENTS

| | | | |
|---|---|---|---|
| 7,428,310 B2* | 9/2008 | Park | H04S 7/301 381/104 |
| 2011/0160885 A1* | 6/2011 | Itskov | H04H 20/61 700/94 |
| 2017/0173262 A1* | 6/2017 | Veltz | A61B 5/0022 |
| 2018/0063618 A1* | 3/2018 | Boesen | H04R 1/10 |
| 2019/0036720 A1* | 1/2019 | Knudson | H04L 12/1895 |
| 2019/0044745 A1* | 2/2019 | Knudson | H04L 12/2821 |

* cited by examiner

*Primary Examiner* — Lun-See Lao
(74) *Attorney, Agent, or Firm* — The Small Patent Law Group LLC; Dean D. Small

(57) ABSTRACT

A method, device, and computer program product for managing transmission of synchronized audio are provided. The method obtains audio test signal (ATS) data based on ATS broadcasts between a group of digital personal assistant (DPA) devices in an environment. The method determines an audible transmission characteristic of interest (COI), with respect to multiple different combinations of the DPA devices from the group of DPA devices, based on the ATS data. The method generates a baseline audio map (BAM) for the group of DPA devices based on the audible transmission COI. The BAM includes compensatory audio settings for locations in the environment. The method configures, for a select location within the environment, one or more current compensatory audio settings for active DPA devices of the group of DPA devices to manage transmission of synchronized audio content at the select location based, at least in part, on the BAM.

20 Claims, 5 Drawing Sheets

METHODS AND DEVICES FOR MANAGING TRANSMISSION OF SYNCHRONIZED AUDIO BASED ON USER LOCATION

FIELD

The present disclosure relates generally to methods and devices for managing transmission of synchronized audio based on user location.

BACKGROUND OF THE INVENTION

In today's technology driven society, many users own multiple electronic devices that can be used for different types of communications, different tasks, and/or at different locations. For example, a user may own multiple digital personal assistant (DPA) devices that are distributed throughout a home.

Generally, a DPA device is an electronic device with a user interface that simulates human traits that allows a human user to interact with the electronic device in a manner similar to interacting with another person, rather than a machine. For example, the DPA device may include a voice recognition system that interprets the voice input of the user and executes services or perform tasks in response thereto. The DPA device also includes a voice interface to audibly respond to the user in a natural language form. Typically, a DPA device operates on a single device with dedicated components to interact with the user. For example, the DPA device may have a built-in microphone to receive user requests and a built-in speaker to provide communications and to output audio or video content to the user. In addition, the DPA device can include a component interface that can connect to wired or wireless electronic devices, such as smart phones, smart televisions, tablets, smart watches, smart appliances, and speakers to control operation of the electronic devices.

However, groups of conventional DPA devices cannot be coordinated with one another, automatically or manually, to deliver synchronized sound at select locations within in an environment. During multi-room playback of music or spoken word content by multiple DPAs, one or more of physical distance, physical obstructions (e.g., walls, floors, furniture, and the like), and network latency can cause audible delay, directionality, and/or echo, rendering the listening experience unsatisfactory or unacceptable. The straight line, speed of sound travel delay over 90 ft (e.g., the diagonal distance of a ~2500 sq. ft house) equals a delay of 80 ms. Relative delays of 5 ms to 50 ms in the same audio content transmitted from multiple DPA devices cause the user to perceive false directionality and/or localization and, thus, incorrectly perceive the direction of the sound. Also, relative delays of over 50 ms for speech and over 100 ms for music in the same audio content transmitted from multiple DPA devices cause the user to perceive echoes. Relative delays due to the speed of sound may be compounded by additional delays due to network latency and physical obstructions.

Accordingly, a need remains for methods and devices that enable for managing transmission of synchronized audio by multiple DPA devices based on user location.

SUMMARY

In accordance with embodiments herein, a method is provided. The method is performed under control of one or more processors configured with executable instructions. The method obtains audio test signal (ATS) data based on ATS broadcasts between a group of digital personal assistant (DPA) devices in an environment. The ATS data is indicative of one or more of transmit time, reception time, transmit volume, and reception volume. The method determines an audible transmission characteristic of interest (COI), with respect to multiple different combinations of the DPA devices from the group of DPA devices, based on the ATS data. The audible transmission COI includes one or more of an amount of transmission delay and an amount of volume variation based on the one or more of transmit time, reception time, transmit volume, and reception volume. The method generates a baseline audio map (BAM) for the group of DPA devices based on the audible transmission COI. The BAM includes compensatory audio settings for locations in the environment. The locations are based on the positions of the DPA devices in the environment. The compensatory audio settings are for implementation on one or more of the DPA devices of the group of DPA devices to manage transmission of synchronized audio content at the locations. The method configures, for a select location within the environment, one or more current compensatory audio settings for active DPA devices of the group of DPA devices to manage transmission of synchronized audio content at the select location based, at least in part, on the BAM.

Optionally, the method may track, as the select location, a position of one or more users within the environment; and, based on detecting a change in position of the one or more users from a first location to a second location. The method may automatically configure, for the second location, compensatory audio settings for active DPA devices of the group of DPA devices to manage transmission of synchronized audio content at the second location. The method may transmit ATS instructions to the group of DPA devices. The ATS instructions may coordinate (i) transmitting at least one ATS from individual DPA devices of the group of DPA devices and recording a corresponding transmission time stamp for each of the at least one ATS, and (ii) recording, at remaining DPA devices of the group of DPA devices, the received at least one ATS from individual DPA devices and a corresponding reception time stamp for each received ATS. Each individual DPA device may transmit an ATS including an identifying tone. The compensatory audio settings may include one or more of an audio timing setting, a power setting, or a volume setting.

Optionally, the method may configure, for at least a first and second locations within the environment, current compensatory audio settings for active DPA devices of the group of DPA devices to manage transmission of synchronized audio content at the at least the first and second locations. Configuring may include managing one or more of a direction or a volume of the compensatory audio settings for active DPA devices based on priorities assigned to users or types of users. The method may transmit a first ATS from a first DPA device and a second ATS from a second DPA device. The method may record the transmission time stamp for the first ATS and the second ATS. The method may record, at a third DPA device, the first ATS and the second ATS and reception time stamps for the first ATS and the second ATS. The method may manage, as part of the compensatory audio settings, the audio timing settings of one or more of the first DPA device, second DPA device, and third DPA device, based on the first and second ATSs, the transmission time stamp for the first and second ATS, and the reception time stamp of the first and second ATS. The ATS may include a transmission volume. The method may determine a correlation of the reception volume relative to the transmission volume and the location of each individual DPA device with respect to the remaining DPA devices of the group.

In accordance with embodiments herein, a device is provided. The device includes an input to receive a user instruction to perform an action, one or more processors, a memory storing program instructions accessible by the one or more processors. Responsive to execution of the program instructions, the one or more processors obtain ATS data based on ATS broadcasts between a group of DPA devices in an environment. The ATS data is indicative of one or more of transmit time, reception time, transmit volume, and reception volume. The one or more processors determine an audible transmission COI, with respect to multiple different combinations of the DPA devices from the group of DPA devices, based on the ATS data. The audible transmission COI includes one or more of an amount of transmission delay and an amount of volume variation based on the one or more of transmit time, reception time, transmit volume, and reception volume. The one or more processors generate a BAM for the group of DPA devices based on the audible transmission COI. The BAM includes compensatory audio settings for locations in the environment. The locations are based on the positions of the DPA devices in the environment. The compensatory audio settings are for implementation on one or more of the DPA devices of the group of DPA devices to manage transmission of synchronized audio content at the locations. The one or more processors configure, for a select location within the environment, one or more current compensatory audio settings for active DPA devices of the group of DPA devices to manage transmission of synchronized audio content at the select location based, at least in part, on the BAM. The device further includes a transceiver to transmit control signals generated by the one or more processors to the group of DPA devices and receive data therefrom.

Optionally, the one or more processors may track, as the select location, a position of one or more users within the environment. The one or more processors may, based on detecting a change in position of the one or more users from a first location to a second location, automatically configure, for the second location, compensatory audio settings for active DPA devices of the group of DPA devices to manage transmission of synchronized audio content at the second location. The one or more processors may transmit audio test signal (ATS) instructions to the group of DPA devices. The ATS instructions may coordinate (i) transmitting at least one ATS from individual DPA devices of the group of DPA devices and recording a corresponding transmission time stamp for each of the at least one ATS, and (ii) recording, at remaining DPA devices of the group of DPA devices, the received at least one ATS from individual DPA devices and a corresponding reception time stamp for each received ATS. Each individual DPA device may transmit an ATS including an identifying tone. The compensatory audio settings may include one or more of an audio timing setting, a power setting, or a volume setting.

Optionally, the one or more processors may, as part of the configure, configure for at least a first and second locations within the environment, current compensatory audio settings for active DPA devices of the group of DPA devices to manage transmission of synchronized audio content at the at least the first and second locations. The one or more processors may, as part of the configure, manage one or more of a direction or a volume of the compensatory audio settings for active DPA devices based on priorities assigned to users or types of users. The one or more processors may transmit a first ATS from a first DPA device and a second ATS from a second DPA device and recording the transmission time stamp for the first ATS and the second ATS. The one or more processors may record, at a third DPA device, the first ATS and the second ATS and reception time stamps for the first ATS and the second ATS. The one or more processors may manage, as part of the compensatory audio settings, the audio timing settings of one or more of the first DPA device, second DPA device, and third DPA device, based on the first and second ATSs, the transmission time stamp for the first and second ATS, and the reception time stamp of the first and second ATS. The one or more processors may, as part of the determine, determine a correlation of the reception volume relative to the transmission volume and the location of each individual DPA device with respect to the remaining DPA devices of the group.

In accordance with embodiments herein, a computer program product is provided. The computer program product includes a non-signal computer readable storage medium comprising computer executable code to obtain ATS data based on ATS broadcasts between a group of DPA devices in an environment. The ATS data is indicative of one or more of transmit time, reception time, transmit volume, and reception volume. The computer program product determines an audible transmission COI, with respect to multiple different combinations of the DPA devices from the group of DPA devices, based on the ATS data. The audible transmission COI includes one or more of an amount of transmission delay and an amount of volume variation based on the one or more of transmit time, reception time, transmit volume, and reception volume. The computer program product generates a BAM for the group of DPA devices based on the audible transmission COI. The BAM includes compensatory audio settings for locations in the environment. The locations are based on the positions of the DPA devices in the environment. The compensatory audio settings for implementation on one or more of the DPA devices of the group of DPA devices manage transmission of synchronized audio content at the locations. The computer program product configures, for a select location within the environment, one or more current compensatory audio settings for active DPA devices of the group of DPA devices to manage transmission of synchronized audio content at the select location based, at least in part, on the BAM.

Optionally, the computer program product includes computer executable code to track, as the select location, a position of one or more users within the environment. The computer program product may, based on detecting a change in position of the one or more users from a first location to a second location, automatically configure, for the second location, compensatory audio settings for active DPA devices of the group of DPA devices to manage transmission of synchronized audio content at the second location. The computer program product may include computer executable code to transmit audio test signal (ATS) instructions to the group of DPA devices. The ATS instructions may coordinate (i) transmitting at least one ATS from individual DPA devices of the group of DPA devices and recording a corresponding transmission time stamp for each of the at least one ATS, and (ii) recording, at remaining DPA devices of the group of DPA devices, the received at least one ATS from individual DPA devices and a corresponding reception time stamp for each received ATS. Each individual DPA device may transmit an ATS including an identifying tone. The computer program product may include computer executable code to, as part of the configure, configure for at least a first and second locations within the environment, current compensatory audio settings for active DPA devices of the group of DPA devices to manage transmission of synchronized audio content at the at least the first and second locations.

DETAILED DESCRIPTION

Figure 1:
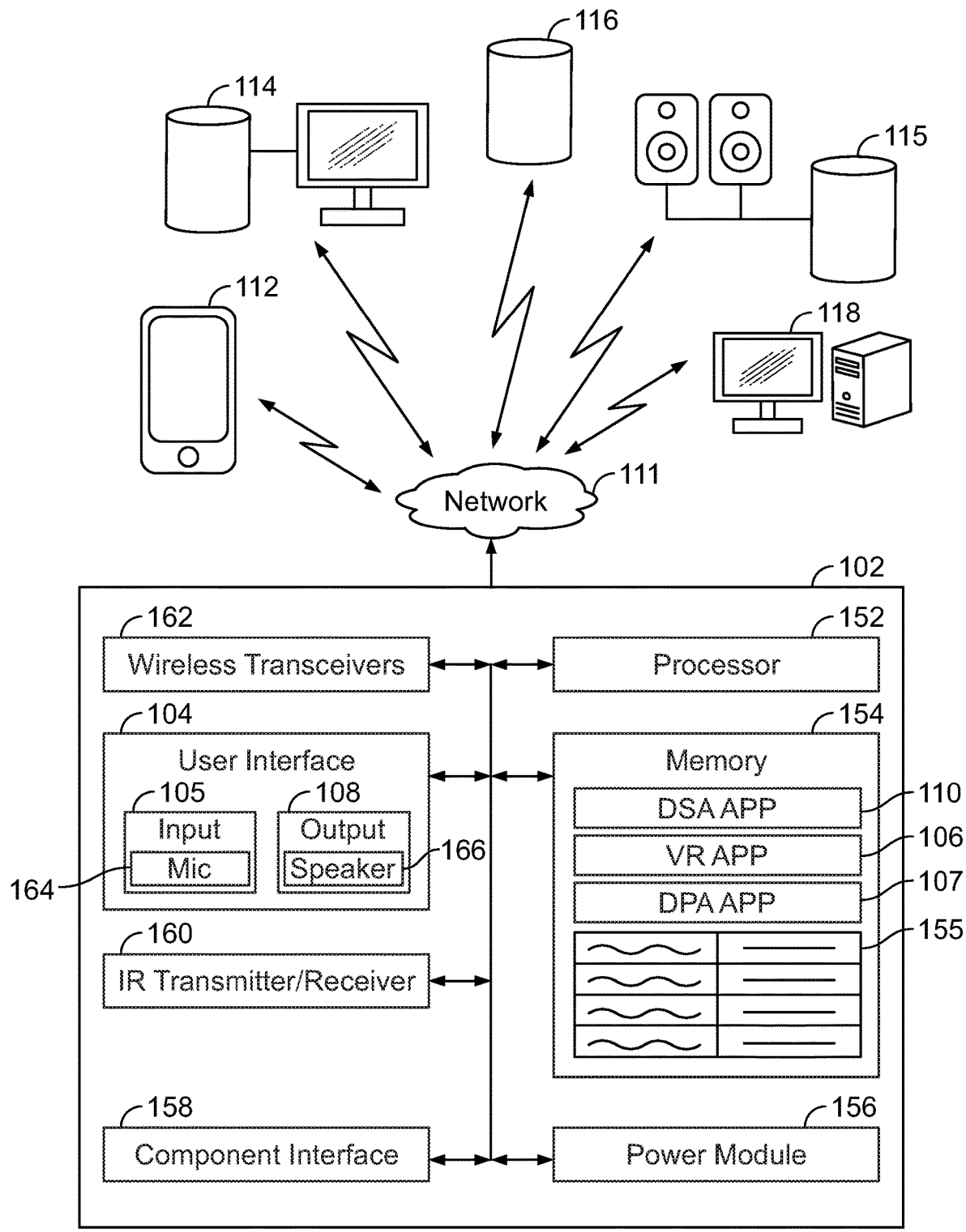
FIG. 1 illustrates a system for managing transmission of synchronized audio based on user location in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Terms

The terms "audio test signal" and "ATS" refer to a reference signal that includes an audible tone corresponding to a known frequency and that is produced at a stable volume. The ATS broadcast/transmitted by each DPA device of a group of DPA devices may include, as a DPA device-identifying characteristic, a unique tone. Coordinated ATS broadcasts by one or more DPA devices from the group of DPA devices may be combined with other information (e.g., transmission time stamps, reception time stamps, transmission volume, reception volume, and the like) and used to, for example and without limitation, determine one or more of an amount of delay or an amount of volume variation for audio content transmitted from the DPA devices for a location in the environment.

The terms "audio test signal instructions" and "ATS instructions" refer to a routine of coordinated transmission and reception of ATS from one or more DPA devices of a group of DPA devices. ATS instructions implemented on a group of DPA devices in an environment may be combined with other information (e.g., transmission time stamps, reception time stamps, transmission volume, reception volume, and the like) and used to, for example and without limitation, determine one or more of an amount of delay or an amount of volume variation between audio content transmitted from each individual DPA device to remaining DPA devices of a group of DPA devices in the environment. For example, ATS instructions may include a routine in which each DPA device of a group of DPA devices takes a turn transmitting one or more ATS with a select transmit volume at a transmission time while the remaining DPA devices of the group record a received ATS with a reception volume and corresponding reception time stamp. In a further example, ATS instructions may include one or more additional routines where a plurality of DPA devices of the group of DPA devices transmit one or more ATS at a transmission time while the remaining DPA devices of the group record received ATS and the corresponding reception time stamps. For example, ATS instructions may include routines where all possible sub-combinations of the group of DPA devices transmit one or more ATS at a transmission time and the remaining DPA devices of the group record received ATSs and the corresponding reception time stamps.

The terms "compensatory audio setting" and "CAS" refer to an amount or level of one or more transmission settings that correspond to a location in an environment and that, when implemented on a given DPA device, compensate for one or more of delay, unintended directionality, or attenuation at the location resulting, at least partially from, baseline transmission settings at the DPA device and that would otherwise be perceived by a user at the location. The baseline transmission settings for a DPA device may include the last-used transmission settings, default transmission settings, current transmission settings prior to synchronization, and the like. Examples of CAS include a delay setting, a power setting, a volume setting, and the like.

The terms "baseline audio map" and "BAM" refer to a collection of data, organized in a database or dataset, that includes at least the locations of each of the DPA devices in a group of DPA devices in an environment and compensatory audio settings for the location of each of the DPA devices, the compensatory audio settings for implementation on one or more of the remaining DPA devices to manage transmission of synchronized audio content at the location. Managing synchronized audio content includes adjusting the relative timing of transmission of audio content from one or more of the other DPA devices of the group to one or more of eliminate delay and/or echo as perceived by a user at a location in the environment. Managing synchronized audio content may also include adjusting the relative transmission settings (e.g., a power setting, a volume setting, and the like) of the one or more of the other DPA devices of the group to manage one or more of the directionality or volume of the audio content as perceived by a user at a location in the environment.

The term "environment" refers to a physical region i) surrounding one or more DPA devices that communicate with one another and ii) in which implementations of DPA functions are at least partially perceivable by individuals. By way of example, an environment may refer to one or more rooms within a house, office or other structure. An environment may or may not have physical boundaries. For example, an environment may refer to one or more of a pool area, a deck, a backyard, exterior areas outside of an office, a commercial area, either alone or in addition to one or more rooms in a house, office, or other structure, where approximate virtual boundaries of the environment correspond to the range over which operational states at and/or actions performed by and/or controlled by at least one DPA device of the group of DPA devices may be heard, seen, felt or otherwise perceived by individuals when present in at least a portion of the environment.

The term "digital personal assistant", "DPA", "DPA device", "virtual assistant", "intelligent digital assistant", as used throughout, shall generally refer to functionality of any electronic device that has a user interface or information processing system that uses a voice recognition system, such as a Natural language understanding (NLU), automatic speech recognition (ASR), or text-to-speech synthesis (TTS), to interpret natural language input in spoken form and/or textual form to infer intent, and perform actions based on an inferred user intent. DPA devices may be, or have a component interface that can connect to and control, wired or wireless electronic devices, such as smart phones, smart televisions, tablets, smart watches, smart appliances, and smart speakers to control operation of the electronic devices. For example, a digital personal assistant may receive a user instruction in the form of a natural language command, request, statement, narrative, and/or inquiry. A user instruction may seek either an informational answer or performance of an action by the digital personal assistant. Accordingly, the digital personal assistant can perform the requested action, send a control signal via the component interface to a connected electronic device to perform the requested action, and/or provide responses in audio and/or visual form, such as natural language, music, video, text, animations, etc.

The term "obtain" or "obtaining", as used in connection with data, signals, information and the like, includes at least one of i) accessing memory of a network hub or resource manager where the data, signals, information, etc. are stored, ii) receiving the data, signals, information, etc. over a wireless communications link between the DPA device and the network hub, and/or iii) receiving the data, signals, information, etc. at a resource manager over a network connection. The obtaining operation, when from the perspective of a DPA device, may include sensing new signals in real time, and/or accessing memory to read stored data, signals, information, etc. from memory within the electronic device. The obtaining operation, when from the perspective of a network hub, includes receiving the data, signals, information, etc. at a transceiver of the network hub where the data, signals, information, etc. are transmitted from a DPA device and/or a resource manager. The obtaining operation may be from the perspective of a resource manager, such as when receiving the data, signals, information, etc. at a network interface from a network hub and/or directly from a DPA device. The resource manager may also obtain the data, signals, information, etc. from local memory and/or from other memory, such as within a cloud storage environment and/or from the memory of a workstation.

System for Managing Transmission of Synchronized Audio

FIG. 1 illustrates a system for managing transmission of synchronized audio based on user location in accordance with embodiments herein. Managing transmission of synchronized audio based on user location includes adjusting the relative timing of the same audio content across active DPA devices of the group of DPA devices to. Synchronizing the streaming of the system 100 includes a local DPA device 102 and one or more remote DPA devices 112-116. The local DPA device 102, among other things, implements a dynamic synchronized audio (DSA) application and tracks a user location. For example, the local DPA device 102 may be a smartphone, a tablet, a smartwatch, or the like. In another example, the one or more remote DPA devices 112-116 may represent the same type or different types of device as the local DPA device 102. Each of the one or more remote DPA devices 112-116 may include one or more of the features and functionality discussed in conjunction with the local DPA device 102. The one or more remote DPA devices 112-116 may be speakers, home theater systems, computers, tablet devices, mobile phones, televisions, communication content players, and the like. For example, the one or more remote DPA devices 112-116 may represent an Amazon Echo® device, Google Home™ device, and the like. Each of the DPA devices 102, 112-116 is capable of processing received instructions from the DSA application, and transmitting information to the DSA application over the network 111 or other type of connection.

As shown in FIG. 1, a local DPA device 102 includes components such as one or more processors 152 (e.g., a microprocessor, microcomputer, application-specific integrated circuit, etc.), one or more local storage medium (also referred to as a memory) 154, a user interface 104 which includes one or more input circuits 105 and one or more output circuits 108, a power module 156, a component interface 158, an infrared (IR) transmitter/receiver 160 and one or more wireless transceivers 162. All of these components can be operatively coupled to one another, and can be in communication with one another, by way of one or more internal communication links, such as an internal bus.

The input circuit 105 receives user instructions in various manners, such as using a voice recognition (VR) application 106. The processors 152 execute instructions stored in the memory 154 to interpret and perform actions based on user instructions that are received through the input circuit 105. The user instruction may represent requests of various types. By way of example, some types of user instructions seek information, such as a question that may be answered by the local DPA device 102 based on content stored therein and/or an automated searched over the Internet and the like. Other types of user instructions may instruct one or more electronic devices 102 to perform various types of actions and/or execute various types of commands, as described herein.

A DSA application 110, among other things, receives user-generated instructions to synchronize audio content and transmits audio test signal (ATS) instructions to remote DPA devices 112-116 in the environment. The ATS instructions coordinate (i) broadcasting/transmitting at least one ATS from each individual DPA device of a group of DPA devices and (ii) recording the audio test signals at the remaining DPA devices within the group of DPA devices. All or a portion of the DPA devices 102, 112-116 may perform the operations described herein in connection with broadcasting and recording ATS related information. As one example, the ATS operations are described with respect to the DPA device 102 acting as a local DPA device while the DPA devices 112-116 are "remote" with respect to the DPA device 102. The remote DPA devices 112-116 broadcast unique tones at select points in time and at select transmission volumes, where the point in time at which the unique tone is broadcast is assigned a transmission time stamp. For example, the remote DPA device 112 broadcasts an audible unique tone at a transmission volume V112 at time stamp T112, the remote DPA device 113 broadcasts an audible unique tone at a transmission volume V113 at time stamp T113, the remote DPA device 114 broadcasts an audible unique tone at a transmission volume V114 at time stamp T114, etc. The "local" DPA device 102 "hears" or receives the audible unique tones with reception volumes V112', V113', V114' and at reception times T112', T113', T114', etc. The local DPA device 102 records the reception volumes and reception time stamps. The DPA devices 112-116 wirelessly transmit, to the local DPA device 102, (e.g., over a communications channel) the transmission times stamps T112', T113', T114', etc. and reception volumes V112', V113', V114', etc.

The foregoing ATS transmissions and measurements are repeated with all or a portion of the DPA devices 112-116 functioning as the "local" DPA device with respect to the remaining DPA devices in the group, such that each individual DPA device 102, 112-116 transmits an ATS that includes an identifying tone, the identifying tone distinguishing ATS transmitted by each individual DPA device from the remaining DPA devices of the group of DPA devices 102, 112-116.

The DSA application 110 obtains ATS data based on ATS broadcasts between the group of DPA devices 102, 112-116. The ATS data is indicative of one or more of transmitted ATS, corresponding transmission volumes, and corresponding transmission time stamps, received ATS, the identity of the corresponding receiving DPA device, corresponding reception volumes, and corresponding reception time stamps. Based on obtaining ATS data, the DSA application 110 determines, an audible transmission COI, with respect to multiple different combinations of the DPA devices from the group of DPA devices, based on the ATS data. Audible transmission COI include one or more of an amount of transmission delay and an amount of volume variation based on one or more of transmit time, reception time, transmit volume, and reception volume. Transmission delay refers to a time period between when one DPA device plays/broadcasts a unique tone and another DPA device receives ("hears") the unique tone. For example, a first/local DPA device may listen for unique tones from the second/remaining DPA devices in a group and identify a set of transmission delays between the first/local DPA device and a corresponding set of second/remaining DPA devices. The volume variation refers to a change/drop in volume between a source volume level/decibels at which the unique tone is played/broadcast/transmitted from one DPA device and a reception volume level/decibels that the unique tone is heard/received at a second DPA device. For example, a second/remaining DPA device (the source DPA) may play the unique tone at a decibel level of 6 dB and the first/local DPA device (the destination DPA) may hear the unique tone at a decibel level of 4 dB. Similar measurements are performed by the first/destination DPA device with respect to transmission delays and/or volume variations for multiple second/remaining DPA devices.

Based on the audible transmission COI identified, the DAS application 110 generates a BAM for the group of DPA devices. The BAM includes compensatory audio settings for locations in the environment. The locations are based on the positions of each individual DPA device 102, 112-116 in the environment. The compensatory audio settings are for implementation on one or more of the remaining DPA devices to manage transmission of synchronized audio content at the locations. The DSA application 110 configures, for a select location within the environment, one or more current compensatory audio settings for active DPA devices of the group of DPA devices to manage transmission of synchronized audio content at the select location based, at least in part, on the BAM.

The DSA application 110 may, based on user instruction, configure current compensatory audio settings for select locations within the environment (e.g., the kitchen, the living room sofa, the patio) or based on user-defined regions or zones (e.g., an upstairs zone and a downstairs zone) within the environment and sub-groups of the group of DPA devices 102, 112-116 associated therewith. Additionally or alternatively, the DSA application 110 may track a location of the user within the environment and automatically update the current compensatory audio settings based on changes in the user location to dynamically synchronize audio content as the user moves about the environment. The DSA application 110 may track the user location intermittently (e.g., based on user interaction with individual DPA devices) or continuously (e.g., based on one or more of geolocation, sound, motion, network location, and the like).

The local DPA device 102 communicates with the one or more remote DPA devices 112-116 over the network 111, such as through a wireless transceiver 162, and/or over a separate wired or wireless link there between. For example, an auxiliary output may be used to form a wired connection. Optionally, a Bluetooth link or other wireless link may be utilized for a direct wireless connection. The local DPA device 102 and remote DPA devices 112-116 may operate in connection with corresponding regions or zones of the environment that may be separate and distinct from one another, partially overlap, wholly overlap, and/or vary over time with movement of the corresponding local DPA device 102 and/or remote DPA device 112-116.

The local DPA device 102 includes an output circuit 108 and transceiver 202, one or both of which may output ATS instructions, and associated requests, to one or more remote DPA devices 112-116. The local DPA device 102 includes a voice recognition type user interface 104 and is configured to access the network 111 over a wired or wireless connection. As non-limiting examples, the local DPA device 102 may access the network 111 through a wireless communications channel and/or through a network connection (e.g., the Internet). Additionally or alternatively, the local DPA device 102 may be a wired or wireless communication terminal, such as a desktop computer, laptop computer, network-ready television, set-top box, and the like.

The local DPA device 102 is configured to access the network resources 118, including web-based or network-based data, applications, and services, via the network 111. The network 111 may represent one or more of a local area network (LAN), a wide area network (WAN), an Intranet or other private network that may not be accessible by the general public, or a global network, such as the Internet or other publicly accessible network. The network 111 provides communication between the local DPA device 102, the one or more remote DPA devices 112-116, and one or more network resources 118. It will be understood that, in some embodiments, the network resources 118 may represent a single entity or one or more physical or virtual servers that are configured to deliver online resources to the local DPA device 102. Examples of the network resources 118 include, but are not limited to, web-based or network-based data storage services, social networking applications, shopping services, payment services, multimedia content delivery services, financial services and the like. The resources 118 may represent a Web service or a network service for an e-commerce business, financial institution, or any other commercial, noncommercial, personal, nonprofit or other entity.

The user interface 104 permits the user to operate the local DPA device 102 for any of its intended purposes, such as administering the DSA application 110, operating software applications, electronic communication, listening to audio media, and the like. The input circuit 105 can include one or more audio input circuits, such as a microphone 164 that is configured to receive audio input (e.g., instructions, requests) from the user. The output 108 can include one or more electronic devices, such as a speaker 166, that are configured to communicate notification alerts or notification content to the user. In association with the VR application 106, the user interface 104 allows the user to communicate with the local DPA device 102 by receiving audio input in the form of natural language. The VR application 106 may interpret the audio input received by the input circuit 105 and may generate communication content, such as a voice interface to audibly respond to the user in a natural language form. When the audio input represents an instruction to synchronize audio or related to synchronizing audio, the VR application 106 passes the instruction to the DSA application 110 to be processed as described herein.

Optionally, the input and output circuits 105, 108 may each include a variety of visual, audio, and/or mechanical devices. For example, the input circuit 105 can include a visual input device, such as an optical sensor or camera, and/or a mechanical input circuit such as a keyboard, keypad, selection hard and/or soft buttons, switch, touchpad, touch screen, icons on a touch screen, a touch sensitive areas on a touch sensitive screen and/or any combination thereof. Similarly, the output circuit 108 can include a visual output circuit such as a liquid crystal display screen, touch sensitive screen, a non-touch sensitive screen, a text-only display, a smart phone display, an audio output (e.g., a speaker or headphone jack), and/or any combination thereof and/or one or more light emitting diode indicators. The output circuit 108 is integral to (e.g., within a common housing) the local DPA device 102.

The memory 154 may encompass one or more memory devices of a variety of forms (e.g., read only memory, random access memory, static random access memory, dynamic random access memory, etc.) and can be used by the processor 152 to store and retrieve data. The data that is stored by the memory 154 can include, but need not be limited to, operating systems, applications, user collected content, and informational data. Each operating system includes executable code that controls basic functions of the device, such as interaction among the various components, communication with external devices via the wireless transceivers 162, the component interface 158, and/or the IR transmitter/receiver 160, and storage and retrieval of applications and data to and from the memory 154. Each application includes executable code that utilizes an operating system to provide more specific functionality for the communication devices, such as file system service and handling of protected and unprotected data stored in the memory 154.

The memory 154 stores various content including, but not limited to, the VR application 106, the DSA application 110 and a DPA device application 107. The DPA device application 107 interacts with the VR application 106 to provide voice recognition. The DPA device application 107 interprets natural language input in spoken form or text form, infers intent therefrom, and perform actions based on the inferred intent on the local DPA device 102. The VR and DSA applications 106, 110 manage one or more operations of the local DPA device 102. The VR and DSA applications 106, 110 include instructions accessible by the one or more processors 152 to direct the processor 152 to implement the methods, processes and operations described herein including, but not limited to, the methods, processes and operations illustrated in the Figures and described in connection with the Figures. In an alternative embodiment, the VR and DSA applications 106, 110 may operate from one or more storage medium (also referred to as cloud storage). The memory 154 may also store one or more lists 155 that contain one or more remote DPA devices 112-116 that are registered for use within the network 111 and/or within an environment. The one or more remote DPA devices 112-116 may be added to the list 155 at the time the DPA device is registered. The list 155 may include unique identifying information for each of the DPA devices thereon, as well as operating characteristics or attributes of the DPA devices that may be relevant to the types of actions that the DPA devices may be able to perform. For example, the characteristics or attributes may indicate the audio settings of the remote DPA devices 112-116, that a remote DPA device 115 is connected to a stereo system, a remote DPA device 116 is operating independently, and a remote DPA device 114 is connected to a smart television.

Among other things, the DSA application 110 manages operation of the processor 152 in association with transmitting ATS instructions to a group of remote DPA devices 112-116 in the environment, obtaining ATS data based on ATS broadcasts between the group of remote DPA devices 112-116 determining an audible transmission COI, with respect to multiple different combinations of the DPA devices from the group of DPA devices, based on the ATS data, generating a BAM for the group of DPA devices based on the audible transmission COI and, configuring, for a select location within the environment, one or more compensatory audio settings for active DPA devices of the group of DPA devices to manage transmission of synchronized audio content at the select location based, at least in part, on the BAM. The processor 152 may identify the user instruction to synchronize audio based on one or more of a type of instruction, a type of action to be performed and/or command to be implemented, and/or a type of operational state required to implement the instruction to synchronize audio on one or more of the local DPA device 102 and the remote DPA devices 112-116.

The processor 152 manages transmission of synchronized audio to a select location from the one or more remote DPA devices 112-116 operatively connected to the local DPA device 102 with respect to implementing the DAS application. For example, the processor 152 can direct the transceiver 162 to transmit an ATS instructions and listen for responses from the remote DPA devices 112-116. The processor 152 analyzes ATS data from the responses to obtain information indicative of the audio transmission delay of each of the remote DPA devices 112-116 based on the user location. Optionally, the processor 152 may analyze data from the responses to obtain additional information about each of the one or more remote DPA devices 112-116. Additional information may include one or more of a device name, a device location, a device manufacturer, a device make, a device model, a device version, other activities currently performed by the device, other activities scheduled to be performed by the device, and the like.

Figure 2:
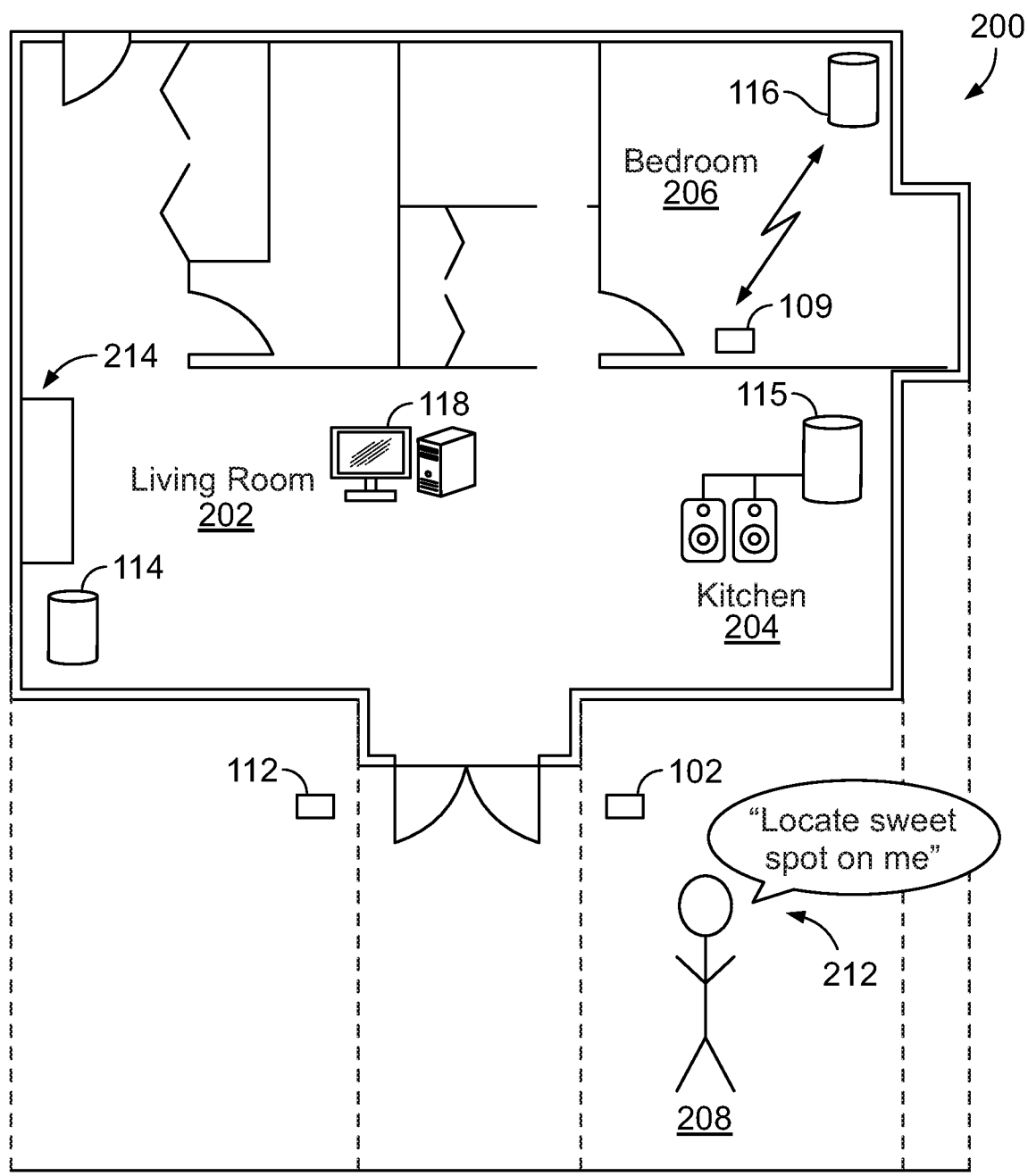
FIG. 2 illustrates a top plan view of an example environment in which embodiments herein may be implemented.

FIG. 2 illustrates a top plan view of an example environment in which embodiments herein may be implemented. The environment 200 may represent a home, office or other structure. In the example of FIG. 2, the environment 200 represents a home with a living room region 202, a kitchen region 204, a bedroom region 206, and an outdoor region 208. The local DPA devices 102 and the remote DPA devices 112-116 are shown at representative locations distributed throughout the environment 200. Additionally or alternatively, one or more of the electronic devices 102, 112-116 may be operably coupled to and control one or more non-DPA electronic devices 210 through a component control interface. Embodiments herein enable managing transmission of synchronized audio to one or more select locations (e.g., one or more user locations) from the local DPA device 102 and the remote DPA devices 112-116 in accordance with embodiments herein.

With reference to the example environment of FIG. 2, the DSA application 110, based on user instruction, configures compensatory audio settings for select locations within the environment (e.g., the kitchen 204, a sofa in the living room 202, the patio 208) or based on user-defined regions or zones (e.g., an indoor zone and an outdoor zone, where the indoor and outdoor zones overlap) within the environment and sub-groups of the group of DPA devices 102, 112-116 associated therewith. The DSA application 110 obtains ATS data based on ATS broadcasts between the group (or sub-groups of) the DPA devices 102, 112-116. The DSA application 110 determines an audible transmission COI, with respect to multiple different combinations of the DPA devices from the group of DPA devices 102, 112-116. The audible transmission COI include, e.g., amounts of transmission delay and amounts of volume variation. Examples of combinations include the DPA device 102 as local and the DPA devices 112-116 as remote, the DPA device 112 as local and the DPA devices 113-116 as remote (not using the DPA device 102), the DPA device 116 as local and the DPA devices 102, 112 as remote (not using DPA devices 113-115), and the like.

The DSA application 110 generates a BAM for the group of DPA devices based on the audible transmission COI. The BAM includes compensatory audio settings for locations of the DPA devices of the group of DPA devices 102, 112-116 for implementation on one or more DPA devices of the group of DPA devices 102, 112-116 to manage transmission of synchronized audio content at the location. In one example, compensatory audio settings for the location of the DPA device 115 in the kitchen 204 may include audio timing settings for implementation on the DPA device 114 in the living room 202 and the DPA device 116 in the bedroom 206 that adjusts the relative timing of transmission of the audio content so that a user at the location of the DPA device 115 does not perceive any delay, echo, unintended directionality, or the like that would render the listening experience unsatisfactory or unacceptable. Based on a known transmission delay of 80 ms between the DPA device 116 and the location of the DPA device 115, a compensatory audio setting for implementation on the DPA device 116 to manage transmission of synchronized audio content at the location includes a timing delay setting that advances the transmission of the audio content from the DPA device 116 by 80 ms relative to transmission of audio content of the DPA device 115 at the location. Likewise, based on a known transmission delay of 40 ms between the DPA device 114 and the location of the DPA device 115, a compensatory audio setting for implementation on the DPA device 114 includes a timing delay setting that advances the transmission of the audio content from the DPA device 114 by 40 ms relative to transmission of audio content of the DPA device 115. Additionally or alternatively, based on a known volume attenuation of 20 dB between the DPA device 116 and the location of the DPA device 115, a compensatory audio setting for implementation on DPA device 116 to manage transmission of synchronized audio content at the location includes a volume setting that increases the volume of the audio content transmitted from the DPA device 116 by 20 dB over the volume of the audio content transmitted by the DPA device 115 at the location. Likewise, based on a known volume attenuation of 10 dB between the DPA device 114 and the location of the DPA device 115, a compensatory audio setting for implementation on DPA device 114 includes a volume setting that increases the volume of the audio content transmitted from the DPA device 114 by 10 dB over the volume of the audio content transmitted by the DPA device 115.

Additionally or alternatively, the DSA application 110 may track a location of the user within the environment and automatically update the compensatory audio settings based on changes in the user location to dynamically synchronize audio content as the user moves about the environment (e.g., moves from the sofa to a chair in the living room, moves about and in between the living room 202, the kitchen 204, the bedroom 206, and the patio 208). The DSA application 110 may track the user location intermittently (e.g., based on user interaction with individual DPA devices) or continuously (e.g., based on one or more of geolocation, sound, motion, network location, and the like). The DSA application 110 may be automatically configured to track the location of one or more users within the environment and manage transmission of synchronized audio based on the user's location and/or may implement tracking based on a user instruction.

Methods for Managing Transmission of Synchronized Audio

Figure 3:
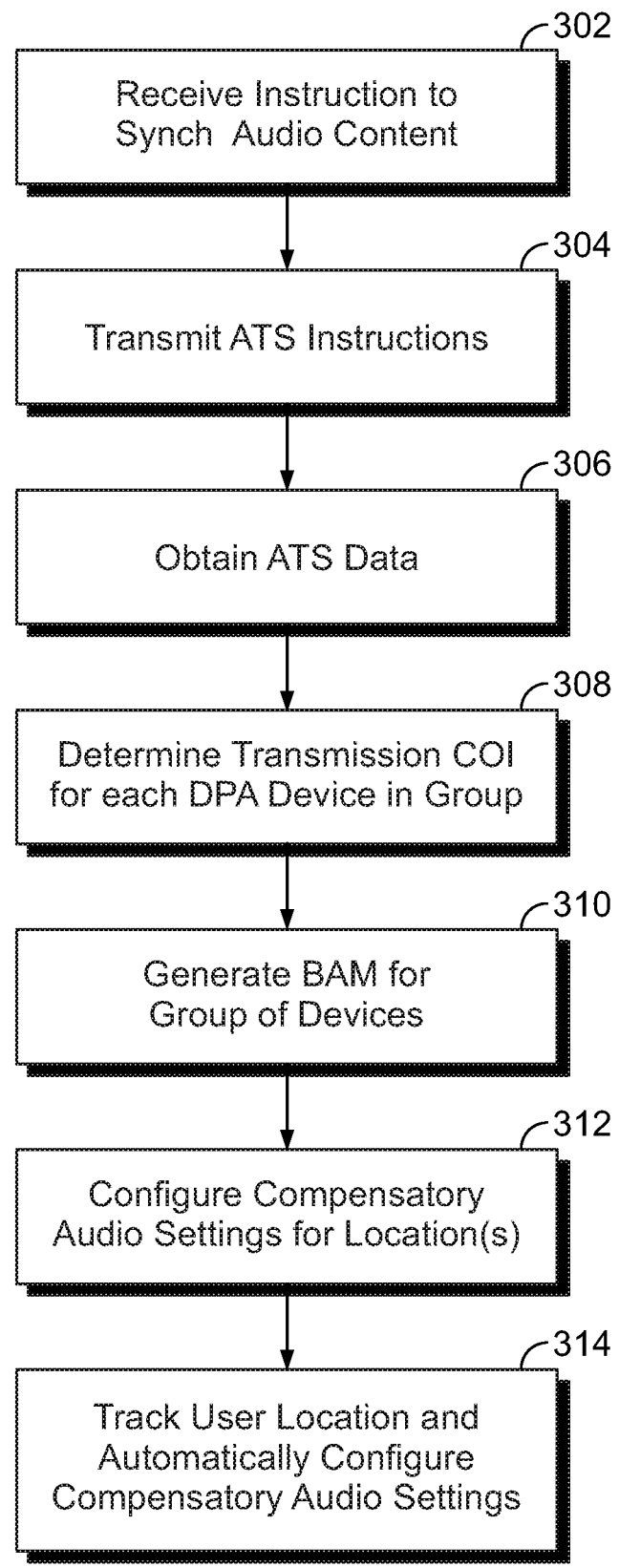
FIG. 3 illustrates a process for managing transmission of synchronized audio based on user location in accordance with embodiments herein.

FIG. 3 illustrates a process for managing transmission of synchronized audio based on user location in accordance with embodiments herein. At 302, one or more processors of the local DPA device 102 receive a user-generated instruction to synchronize audio content of all of, or a sub-group of, the local DPA device 102 and the remote DPA devices 112-116. The local DPA device 102 and the remote DPA devices 112-116 may be registered by the user on the DSA application 110, e.g., as described in relation to FIG. 4. Additionally or alternatively, the local DPA device 102 may engage in a back-and-forth communication with each of the remote DPA devices 112-116. During the exchange, the local DPA device 102 transmits an inquiry to the one or more remote DPA devices 112-116, and receives response data from the one or more remote DPA devices 112-116. The local DPA device 102 determines/identifies identification and/or location data for each remote DPA device 112-116 in the environment, from the one or more remote DPA devices 112-116 based on the response data.

At 304, one or more processors of the local DPA device 102 transmit ATS instructions to remote DPA devices 112-

116 in the environment. The ATS instructions coordinate (i) transmitting at least one ATS from one or more DPA devices of the group of DPA devices 102, 112-116 in the environment and recording a corresponding transmission time stamp for each of the at least one ATS, and (ii) recording, at remaining DPA devices of the group of DPA devices 102, 112-116, one or more received ATS and corresponding reception time stamps. Each individual DPA device 102, 112-116 transmits an ATS that includes an identifying tone. The identifying tone is unique to individual DPA devices of the group of DPA devices. Optionally, the ATS transmitted by each individual DPA device may also include a transmission volume and each received ATS may also include reception volume. For example, the local DPA device 102 (e.g., a smartphone or tablet under control of a user) transmits ATS instructions to the remaining DPA devices of the group of DPA devices 112-116. In the example, the ATS instructions include a routine in which each individual DPA device of the group of DPA devices 102, 112-116 takes a turn transmitting one or more ATS at a corresponding transmission time while the remaining DPA devices of the group record one or more received ATS and corresponding reception time stamps. Optionally, the ATS instructions may further include an additional routine where some or all possible sub-combinations of the group of DPA devices transmit one or more ATS at a transmission time and the remaining DPA devices of the group record received ATSs and the corresponding reception time stamps.

At 306, one or more processors of the local DPA device 102 obtain ATS data based on ATS broadcasts between the remote DPA devices 112-116. The ATS data is indicative of one or more transmitted ATS, corresponding transmission volumes, and corresponding transmission time stamps, one or more received ATS, the identity of the corresponding receiving DPA device, corresponding reception volumes, and corresponding reception time stamps.

At 308, one or more processors of the local DPA device 102 determine, an audible transmission characteristic of interest (COI), with respect to multiple different combinations of the DPA devices from the group of DPA devices, based on the ATS data. Examples of different combinations include the DPA device 102 as local and the DPA devices 112-116 as remote, the DPA device 115 as local and the DPA devices 112, 113, 116 as remote (not using the DPA device 102), the DPA device 112 as local and the DPA devices 113, 115 as remote (not using DPA devices 102, 114, 116), and the like. One or more of the multiple different combinations may be based at least in part on one or more user-assigned regions or sub-groups of the group of DPA devices 102, 112-116. The at least one audible transmission COI includes one or more of an amount of transmission delay and an amount of volume variation (e.g., volume attenuation) based on one or more of transmission time, reception time, transmission volume, and reception volume. Based on receiving the ATS data, the local DPA device 102 may identify, for individual DPA devices, the at least one ATS transmitted thereby based on the identifying tone. The local DPA device 102, for individual DPA devices, determines the audible transmission COI with respect to the locations of each of the remaining DPA devices. The audible transmission COI are determined based on analyzing the at least one ATS transmitted from the individual DPA device, the corresponding transmission time stamp, each received ATS, the identity of the corresponding receiving DPA device, and the corresponding reception time stamps. For example, the local DPA device 102, for individual DPA devices, determines an audio transmission delay at the locations of remaining DPA devices of the group of DPA devices 102, 112-116 based on analyzing the at least one ATS transmitted thereby, the corresponding transmission time stamp, each received ATS, the identity of the corresponding receiving DPA device, and the corresponding reception time stamps. (E.g., the DPA device 114 has transmission delays of 10 ms to the DPA device 112, 25 ms to the DPA device 102, 48 ms to the DPA device 115, and 90 ms to DPA device 116.) Optionally, the local DPA device 102, for individual DPA devices, determines volume variation at the locations of remaining DPA devices of the group of DPA devices 102, 112-116, based on the corresponding transmission volume, the corresponding reception volumes, and the identity and/or location of the corresponding receiving DPA device. (E.g., the DPA device 114 has volume attenuation of 20 dB at the DPA device 112, 25 at the DPA device 102, 5 dB at the DPA device 115, and 30 dB to DPA device 116.)

At 310, one or more processors of the local DPA device 102 generate a BAM for the group of DPA devices 102, 112-116 based on the audible transmission COI. The BAM includes compensatory audio settings for locations in the environment. The locations are based on the positions of the DPA devices of the group of DPA devices 102, 112-116 in the environment. The BAM may also include other identifying information (e.g., device type, assigned subgroups for the device, device names, and the like) for the group of DPA devices 102, 112-116. The BAM may be organized into a database or other dataset and stored in memory 154 on the local DPA device 102 or in a location otherwise accessible by the local DPA device 102 (e.g., network resource 118). The compensatory audio settings are for implementation on one or more of the remaining DPA devices to manage transmission of synchronized audio content at the location. Compensatory audio settings for a DPA device and a location include settings that compensate for one or more of delay, echo, unintended directionality, or attenuation at the location resulting, at least partially, from the baseline transmission settings at the DPA devices and that would otherwise be perceived by a user at the location. In one example, compensatory audio settings for the location of the DPA device 116 in the bedroom 206 may include audio timing settings for implementation on the DPA devices 114, 115 (e.g., a timing delay setting to advance transmission of audio content by the measured transmission delay from the DPA device 114 to the DPA device 116) that adjust the relative timing of transmission of the audio content from the DPA devices 114, 115 so that a user in the bedroom 206 does not perceive any delay, echo, unintended directionality, or the like. Additionally or alternatively, compensatory audio settings for the location of the DPA device 116 in the bedroom 206 may include volume settings for implementation on the DPA devices 114, 115 (e.g., a volume setting to increase the transmitted volume of audio content by the volume at the DPA device 116 plus the measured attenuation of volume from the DPA devices 114, 115 to the DPA device 116) to equalize the volume of transmitted audio content from the DPA devices 114, 115 perceivable by a user in the bedroom 206.

At 312, one or more processors of the local DPA device 102 configure, for at least one select location within the environment, compensatory audio settings for active DPA devices of the group of DPA devices to manage transmission of synchronized audio content at the select location based, at least in part, on the BAM. Based on the select location not corresponding to the previous location of a mobile DPA device (e.g., a smartphone, a tablet, a smartwatch, and the like) or the fixed location of other DPA devices (e.g., the DPA device 116 in the bedroom 206, the DPA device 114 in the living room 202, the DPA device in the kitchen 204, and the like), the process determines compensatory audio settings for the select location based on extrapolating a value for one or more audible transmission COI based on the known locations and corresponding audible transmission COI of one or more of the group of DPA devices. Extrapolation of values for the one or more audible transmission COI can be performed using mathematical techniques such as, for example and without limitation, triangulation and quadrature to determine values for the select location. Additionally or alternatively, the process may determine compensatory audio settings for the select location based on transmitting ATS instructions to nearby DPA devices, receiving ATS data from the nearby DPA devices, and determining at least one audible transmission COI for the location based on the ATS data.

In one example, the one or more processors of the local DPA device 102 may, based on user instruction, configure compensatory audio settings for the group of DPA devices 102, 112-116 for discrete user-selected locations within the environment (e.g., the kitchen, the living room sofa, the patio) and store those settings for future use based on sensing a user's presence in the discrete locations. For example, a user of the local DPA device 102 sits on a sofa in the living room and tells the local DPA to "locate sweet spot on sofa". Based on the user instruction, the one or more processors of the local DPA device 102 configure compensatory audio settings for a location corresponding to the sofa in the living room. Upon configuring the compensatory audio settings for the location, the one or more processors of the local device 102 store the location and corresponding compensatory audio settings. Optionally, the one or more processors of the local device 102 may prompt the user to assign a name to the location.

In an additional or alternative example, the one or more processors of the local device 102 dynamically update the compensatory audio settings for the group of DPA devices 102, 112-116 based on detecting the user's location within the environment and pre-configured compensatory audio settings corresponding to the user's location. The user's location may be detected by interaction with individual DPA devices, motion sensors, audio sensors, a network location of a portable device associated with the user, or geolocation of a portable device associated with the user. For example, as a user moves between the living room 202, the kitchen 204, and the bedroom 206, the one or more processors update the compensatory audio settings based on detecting the user in the different rooms without the user providing any instruction to do so.

In an additional or alternative example, based on user-defined regions or zones within the environment and sub-groups of the group of DPA devices 102, 112-116 associated therewith (e.g., an upstairs zone and a downstairs zone), the one or more processors of the local DPA device 102 may configure compensatory audio settings for sub-groups of DPA devices 102, 112-116 for discrete or dynamic user locations within the region (e.g., a bedroom or theater room in the upstairs zone, or the living room or the patio in the downstairs zone). In a further example, the one or more processors of the local DPA device 102 may, based on priorities assigned to one or more users or types of users, manage one or more transmission setting of the compensatory audio settings for DPA devices in the group (or sub-group) of DPA devices 102, 112-116 to manage synchronization of audio based on the assigned priorities. For example, parents may be prioritized over children based on one or more of direction or volume of synchronized audio content (e.g., louder for parents and quieter for children or vice versa). In another example, synchronized audio for a first zone may be prioritized over synchronized audio for a second zone (e.g., prioritize synchronization for upstairs zone or downstairs zone).

Optionally, at 314, one or more processors of the local DPA device 102 may track, as the select location, the user's location within the environment and automatically update the compensatory audio settings based on changes in the user location to dynamically synchronize audio content as the user moves about the environment (e.g., moves from the sofa to a chair in the living room, moves about and in between the living room 202, the kitchen 204, the bedroom 206, and the patio 208). The process may implement tracking the user's location and continuously configuring compensatory audio settings based on changes in the user's location either automatically or based on a user instruction to do so. For example, a user of the local DPA device 102 tells the local DPA to "locate sweet spot on me". Based on the user instruction, the one or more processors of the local DPA device 102 continuously detect the user location and continuously configure compensatory audio settings for a location corresponding to the sofa in the living room.

Figure 4:
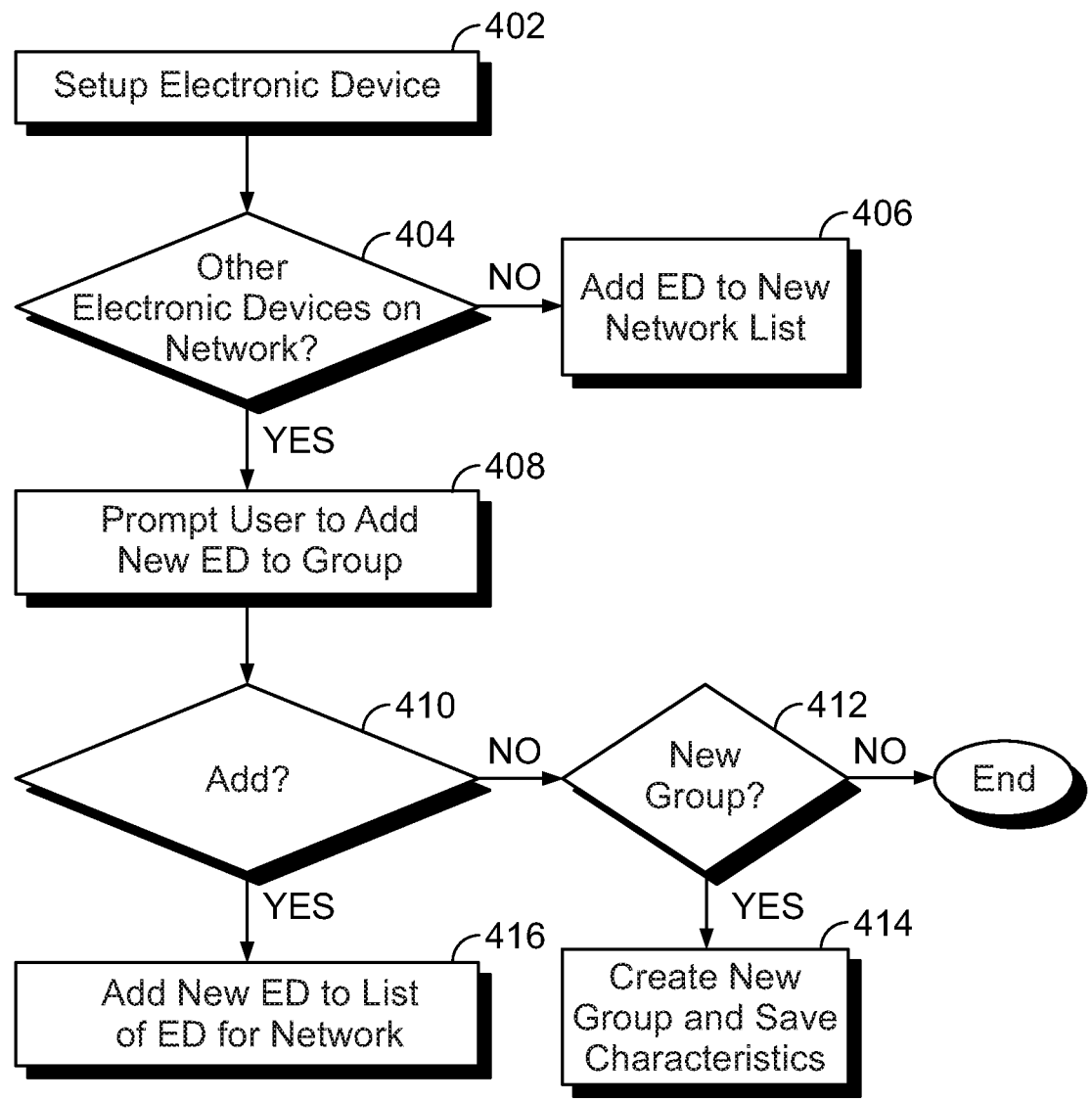
FIG. 4 illustrates an example process for managing transmission of synchronized audio based on a plurality of user locations in accordance with embodiments herein.

FIG. 4 illustrates an example process for registering DPA devices with a network 111 in accordance with embodiments herein. The operations of FIG. 4 may be performed by one or more processors of a new DPA device being registered and/or by a device DPA already registered on a network (e.g., local DPA device 102) and/or by a remote resource (e.g., remote resource 118 in FIG. 1). At 402, a DPA device is initially set up. For example, one or more processors of the DPA device and/or remote resource may step through a series of questions and operations to collect various information, such as user preferences, network ID information, an environment where the DPA devices are located, and the like. At 404, the one or more processors determine whether other DPA devices already exist on the network. When no other DPA devices exist on the network, flow moves to 406 where a new network list is created and the new DPA device is automatically added to the newly created list. Operational information concerning the DPA device is also stored with the list, such as a device identifier, device hardware/software capabilities and functionality, hardware/software versions, connections to other devices (e.g., televisions, appliances, stereo systems, security circuits, locking circuits, thermostats and the like).

Returning to 404, when other DPA devices already exist on the network 111, flow moves to 408. At 408, the one or more processors prompt the user to determine whether the user desires to add the new DPA device to a group of DPA devices associated with the network. As a further option, the user may be prompted for more specific information concerning one or more subgroups of the group of DPA devices based on a region or zone within the environment (e.g., an upstairs zone and a downstairs zone). For example, the user may be prompted to indicate whether the user wants to include the newly added DPA device to a downstairs zone of a house.

At 410, the one or more processors determine whether to add the new DPA device to the existing group and/or subgroups based on the user feedback received at 408. When the new DPA device is not to be added to an existing group, flow moves to 412. Otherwise flow advances to 416. At 412, the one or more processors prompt the user as to whether the user desires to create a new group or subgroup. If not, the process ends without adding the new DPA device to any group/list. When a new group or subgroup is to be created at 412, flow moves to 414. At 414, the one or more processors step through a series of questions and operations to create a new group and/or subgroup that includes the newest DPA device, and one or more characteristics of the group and/or subgroup and characteristics of interest related to the DPA device are saved with the new group list.

Returning to 410, when the new DPA device is to be added to the total group of DPA devices on the network, flow moves to 416. At 416, the one or more processors add the new DPA device to a list (e.g., 155 in FIG. 1) of DPA devices associated with an existing network. Characteristics of interest associated with the new DPA device are also added to the list.

Figure 5:
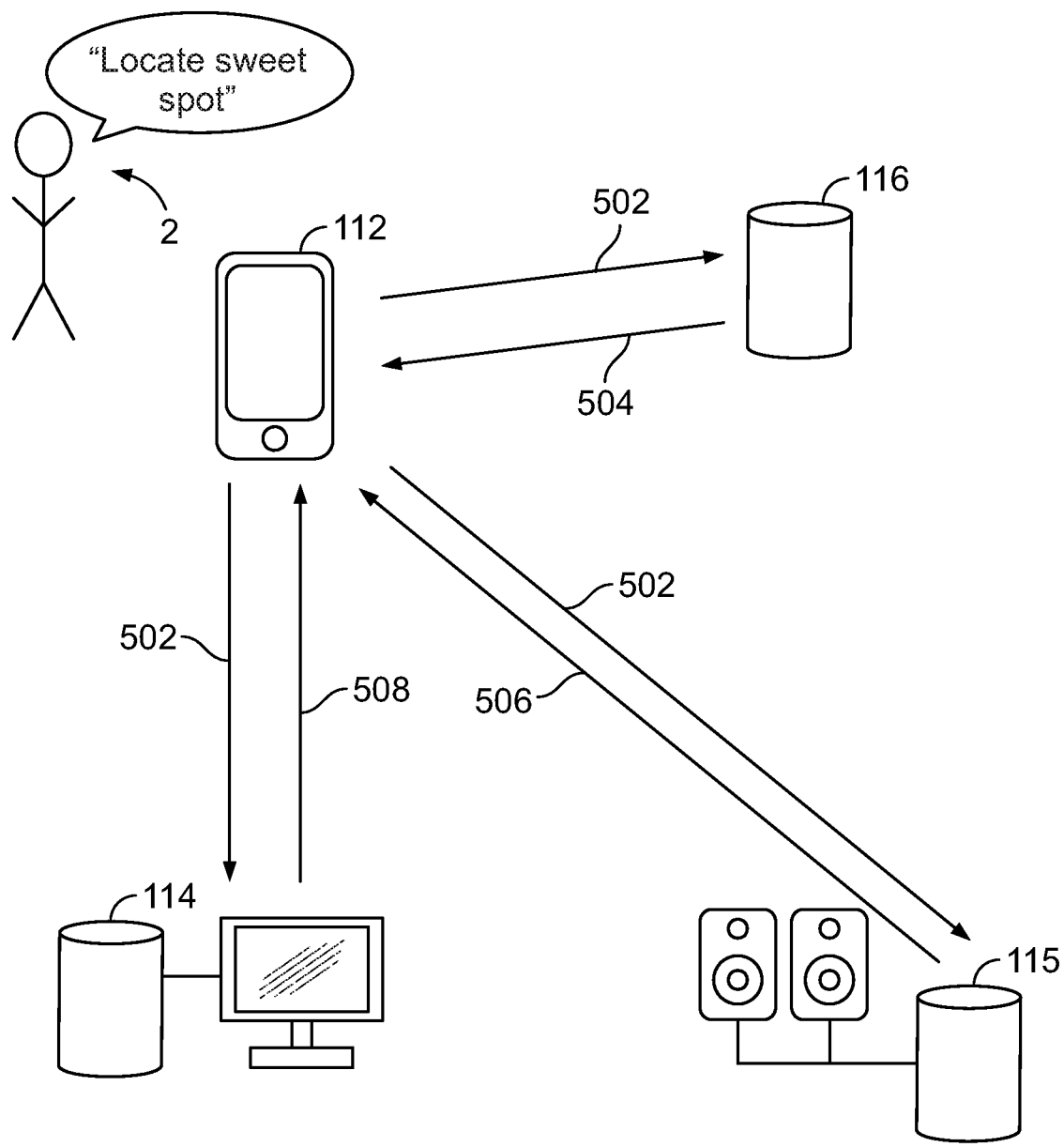
FIG. 5 illustrates an example of communications between one or more remote DPA devices and a local DPA device for managing transmission of synchronized audio in accordance with embodiments herein.

FIG. 5 illustrates an example of communications between one or more remote DPA devices and a local DPA device for managing transmission of synchronized audio in accordance with embodiments herein. With reference to FIGS. 1 and 2, in one example after an initial set-up process has taken place, when a user is in a location in the living room, the user 212 instructs the DSA application implemented on the user's tablet or smartphone 112 to "locate sweet spot". Based on receiving the instruction, the DSA application 110 implemented on the smartphone 112 transmits ATS instructions to nearby DPA devices 114-116 in the environment and the nearby DPA devices sequentially transmit an ATS to the user's tablet or cellphone 112. Each of the nearby DPA devices sequentially transmits, at 504, 506, and 508, an ATS at t+0 ms and having a transmission volume of 50 decibels. The received ATS at smartphone 112 for DPA device 116 includes a reception time stamp t+6 ms and has a reception volume of 40 decibels. The received ATS at smartphone 112 for DPA device 115 includes a reception time stamp t+100 ms and has a reception volume of 30 decibels. The received ATS at smartphone 112 for DPA device 114 includes a reception time stamp t+0 ms and has a reception volume setting of 50 decibels.

The DSA application 110 obtains the ATS data from and determines audible transmission COI for each of the nearby DPA devices 114-116. The audible transmission COI include the amount of transmission delay and the amount of volume variation between the transmitted audio signal and the received audio signal. Based on the unique tones, the DSA application 110 identifies the ATS transmitted by each one of the DPA device 114-116. The DSA application 110 determines, for the user's location, a transmission delay of 6 ms from the DPA device 116, 100 ms from the DPA device 115, and 0 ms from the DPA device 114. Likewise, the DSA application 110 determines, for the user's location, a volume attenuation of 10 decibels from the DPA device 116, volume attenuation of 20 decibels from the DPA device 115, and volume attenuation of 0 decibels from the DPA device 114. Based on the audible transmission COI and the BAM, the DSA application 110 configures compensatory audio settings for the each of the group of DPA devices 114-116 to manage transmission of synchronized audio content at the user's location.

The DSA application 114 configures compensatory audio settings for the DPA device 116 to advance the timing of the audio content transmitted by DPA device 116 by 6 ms, thereby avoiding perceptible delay at the user's location and for the DPA device 115 to advance the timing of the audio content transmitted by the DPA device 115 by 100 ms thereby avoiding perceptible echo at the user's location. The DSA application 114 configures compensatory audio settings for the DPA device 116 to increase the volume of the audio content transmitted by the DPA device 116 by 10 decibels and by the DPA 115 by 20 decibels, thereby maintaining a constant level of volume at the user's location. Given the proximity of the user's location to the DPA device 114, there is no delay or attenuation of volume that is perceivable by the user, so no adjustment is made for DPA device 114. Upon implementation of the compensatory audio settings on the DPA devices 114-116, the transmission settings at each of the DPA devices 114-116 are managed to synchronize common audio content transmitted by all devices 114-116 based on the user's location.

CLOSING STATEMENTS

Before concluding, it is to be understood that although e.g., a software application for undertaking embodiments herein may be vended with a device such as the system 100, embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. Further, in the following claims, phrases in the form of "at least A or B", "A and/or B", and "one or more of A and B" (where "A" and "B" represent claim elements), are used to encompass i) A, ii) B and/or iii) both A and B.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members.

Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
under control of one or more processors configured with executable instructions:
obtaining audio test signal (ATS) data based on ATS broadcasts between a group of digital personal assistant (DPA) devices in an environment, the ATS data indicative of one or more of transmit time, reception time, transmit volume, and reception volume;
determining an audible transmission characteristic of interest (COI), with respect to multiple different combinations of the DPA devices from the group of DPA devices, based on the ATS data, the audible transmission COI including one or more of an amount of transmission delay and an amount of volume variation based on the one or more of transmit time, reception time, transmit volume, and reception volume;
generating a baseline audio map (BAM) for the group of DPA devices based on the audible transmission COI, the BAM including compensatory audio settings for locations in the environment, the locations based on the positions of the DPA devices in the environment, the compensatory audio settings for implementation on one or more of the DPA devices of the group of DPA devices to manage transmission of synchronized audio content at the locations; and
configuring, for a select location within the environment, one or more current compensatory audio settings for active DPA devices of the group of DPA devices to manage transmission of synchronized audio content at the select location based, at least in part, on the BAM.

2. The method of claim 1, further comprising tracking, as the select location, a position of one or more users within the environment; and, based on detecting a change in position of the one or more users from a first location to a second location, automatically configuring, for the second location, compensatory audio settings for active DPA devices of the group of DPA devices to manage transmission of synchronized audio content at the second location.

3. The method of claim 1, further comprising transmitting audio test signal (ATS) instructions to the group of DPA devices, the ATS instructions coordinating (i) transmitting at least one ATS from individual DPA devices of the group of DPA devices and recording a corresponding transmission time stamp for each of the at least one ATS, and (ii) recording, at remaining DPA devices of the group of DPA devices, the received at least one ATS from individual DPA devices and a corresponding reception time stamp for each received ATS, each individual DPA device transmitting an ATS including an identifying tone.

4. The method of claim 3, wherein the compensatory audio settings include one or more of an audio timing setting, a power setting, or a volume setting.

5. The method of claim 1, wherein configuring further comprises configuring, for at least a first and second locations within the environment, current compensatory audio settings for active DPA devices of the group of DPA devices to manage transmission of synchronized audio content at the at least the first and second locations.

6. The method of claim 1, wherein configuring further comprises managing one or more of a direction or a volume of the compensatory audio settings for active DPA devices based on priorities assigned to users or types of users.

7. The method of claim 1, further comprising:
transmitting a first ATS from a first DPA device and a second ATS from a second DPA device and recording the transmission time stamp for the first ATS and the second AT S;
recording, at a third DPA device, the first ATS and the second ATS and reception time stamps for the first ATS and the second ATS;
managing, as part of the compensatory audio settings, the audio timing settings of one or more of the first DPA device, second DPA device, and third DPA device, based on the first and second ATSs, the transmission time stamp for the first and second ATS, and the reception time stamp of the first and second ATS.

8. The method of claim 1, wherein the ATS further includes a transmission volume, and wherein determining includes determining a correlation of the reception volume relative to the transmission volume and the location of each individual DPA device with respect to the remaining DPA devices of the group.

9. A device, comprising:
an input to receive a user instruction to perform an action;
one or more processors;
a memory storing program instructions accessible by the one or more processors, wherein, responsive to execution of the program instructions, the one or more processors perform the following:
obtain audio test signal (ATS) data based on ATS broadcasts between a group of digital personal assistant (DPA) devices in an environment, the ATS data indicative of one or more of transmit time, reception time, transmit volume, and reception volume;
determine an audible transmission characteristic of interest (COI), with respect to multiple different combinations of the DPA devices from the group of DPA devices, based on the ATS data, the audible transmission COI including one or more of an amount of transmission delay and an amount of volume variation based on the one or more of transmit time, reception time, transmit volume, and reception volume;
generate a baseline audio map (BAM) for the group of DPA devices based on the audible transmission COI, the BAM including compensatory audio settings for locations in the environment, the locations based on the positions of the DPA devices in the environment, the compensatory audio settings for implementation on one or more of the DPA devices of the group of DPA devices to manage transmission of synchronized audio content at the locations; and
configure, for a select location within the environment, one or more current compensatory audio settings for active DPA devices of the group of DPA devices to manage transmission of synchronized audio content at the select location based, at least in part, on the BAM; and
a transceiver to transmit control signals generated by the one or more processors to the group of DPA devices and receive data therefrom.

10. The device of claim 9, wherein the one or more processors are further configured to track, as the select location, a position of one or more users within the environment; and, based on detecting a change in position of the one or more users from a first location to a second location, automatically configuring, for the second location, compensatory audio settings for active DPA devices of the group of DPA devices to manage transmission of synchronized audio content at the second location.

11. The device of claim 9, wherein the one or more processors are further configured to transmit audio test signal (ATS) instructions to the group of DPA devices, the ATS instructions coordinating (i) transmitting at least one ATS from individual DPA devices of the group of DPA devices and recording a corresponding transmission time stamp for each of the at least one ATS, and (ii) recording, at remaining DPA devices of the group of DPA devices, the received at least one ATS from individual DPA devices and a corresponding reception time stamp for each received ATS, each individual DPA device transmitting an ATS including an identifying tone.

12. The device of claim 9, wherein the compensatory audio settings include one or more of an audio timing setting, a power setting, or a volume setting.

13. The device of claim 9, wherein the one or more processors, as part of the configure, configure for at least a first and second locations within the environment, current compensatory audio settings for active DPA devices of the group of DPA devices to manage transmission of synchronized audio content at the at least the first and second locations.

14. The device of claim 9, wherein the one or more processors, as part of the configure, manage one or more of a direction or a volume of the compensatory audio settings for active DPA devices based on priorities assigned to users or types of users.

15. The device of claim 1, wherein the one or more processors are further configured to:

transmit a first ATS from a first DPA device and a second ATS from a second DPA device and recording the transmission time stamp for the first ATS and the second AT S;

record, at a third DPA device, the first ATS and the second ATS and reception time stamps for the first ATS and the second ATS;

manage, as part of the compensatory audio settings, the audio timing settings of one or more of the first DPA device, second DPA device, and third DPA device, based on the first and second ATSs, the transmission time stamp for the first and second ATS, and the reception time stamp of the first and second ATS.

16. The device of claim 1, wherein the one or more processors are further configured to, as part of the determine, determine a correlation of the reception volume relative to the transmission volume and the location of each individual DPA device with respect to the remaining DPA devices of the group.

17. A computer program product comprising a non-signal computer readable storage medium comprising computer executable code to:

obtain audio test signal (ATS) data based on ATS broadcasts between a group of digital personal assistant (DPA) devices in an environment, the ATS data indicative of one or more of transmit time, reception time, transmit volume, and reception volume;

determine an audible transmission characteristic of interest (COI), with respect to multiple different combinations of the DPA devices from the group of DPA devices, based on the ATS data, the audible transmission COI including one or more of an amount of transmission delay and an amount of volume variation based on the one or more of transmit time, reception time, transmit volume, and reception volume;

generate a baseline audio map (BAM) for the group of DPA devices based on the audible transmission COI, the BAM including compensatory audio settings for locations in the environment, the locations based on the positions of the DPA devices in the environment, the compensatory audio settings for implementation on one or more of the DPA devices of the group of DPA devices to manage transmission of synchronized audio content at the locations; and configure, for a select location within the environment, one or more current compensatory audio settings for active DPA devices of the group of DPA devices to manage transmission of synchronized audio content at the select location based, at least in part, on the BAM.

18. The computer program product of claim 17, further comprising computer executable code to track, as the select location, a position of one or more users within the environment; and, based on detecting a change in position of the one or more users from a first location to a second location, automatically configuring, for the second location, compensatory audio settings for active DPA devices of the group of DPA devices to manage transmission of synchronized audio content at the second location.

19. The computer program product of claim 17, further comprising computer executable code to transmit audio test signal (ATS) instructions to the group of DPA devices, the ATS instructions coordinating (i) transmitting at least one ATS from individual DPA devices of the group of DPA devices and recording a corresponding transmission time stamp for each of the at least one ATS, and (ii) recording, at remaining DPA devices of the group of DPA devices, the received at least one ATS from individual DPA devices and a corresponding reception time stamp for each received ATS, each individual DPA device transmitting an ATS including an identifying tone.

20. The computer program product of claim 17, further comprising computer executable code to, as part of the configure, configure for at least a first and second locations within the environment, current compensatory audio settings for active DPA devices of the group of DPA devices to manage transmission of synchronized audio content at the at least the first and second locations.

* * * * *